United States Patent [19]

Dinerman et al.

[11] Patent Number: 5,035,605
[45] Date of Patent: Jul. 30, 1991

[54] NOZZLE SHUT-OFF VALVE FOR AN INJECTION MOLDING MACHINE

[75] Inventors: Alex Dinerman; Norman L. Steffens, both of Cincinnati, Ohio

[73] Assignee: Cincinnati Milacron Inc., Cincinnati, Ohio

[21] Appl. No.: 481,018

[22] Filed: Feb. 16, 1990

[51] Int. Cl.$^5$ .............................................. B29C 45/23
[52] U.S. Cl. .................... 425/564; 251/344; 251/345
[58] Field of Search ................ 137/625.31; 251/343, 251/344, 345; 425/564

[56] References Cited

U.S. PATENT DOCUMENTS

| | | | |
|---|---|---|---|
| 1,944,739 | 1/1934 | Hunt | 251/344 |
| 3,106,379 | 10/1963 | Sciuto et al. | 251/344 |
| 3,135,293 | 6/1964 | Hulsey | 251/345 |
| 3,431,600 | 3/1969 | Bullard et al. | 425/564 |
| 3,500,501 | 3/1970 | Johansson | 425/563 |
| 3,809,519 | 5/1974 | Garner | 425/245 |
| 4,037,623 | 7/1977 | Beswick | 251/345 |
| 4,272,236 | 6/1981 | Rees et al. | 425/564 |
| 4,850,851 | 7/1989 | Dinerman | 425/562 |

FOREIGN PATENT DOCUMENTS

| | | | |
|---|---|---|---|
| 221638 | 11/1957 | Australia | 251/344 |
| 183386 | 10/1955 | Austria | 251/344 |
| 671915 | 3/1929 | France | 251/344 |
| 802039 | 3/1936 | France | 251/345 |
| 499344 | 3/1953 | Italy | 251/344 |
| 319345 | 3/1957 | Switzerland | 251/344 |
| 558900 | 2/1975 | Switzerland | 251/344 |
| 514980 | 9/1976 | U.S.S.R. | 251/344 |

Primary Examiner—Timothy Heitbrink
Attorney, Agent, or Firm—Nies, Kurz, Bergert & Tamburro

[57] ABSTRACT

A nozzle shut-off valve for the plastication system of an injection molding machine. The valve includes a cylindrical body member that has axially spaced inlet and outlet passageways. Inclined passageways that extend from the inlet and outlet passageways to the outer surface of the body member to terminate in spaced openings on the periphery of the inner body member. A tubular outer member is provided with at least one recess or depression on its inner surface, the recess having a length sufficient to provide communication between a pair of the spaced peripheral openings in the inner body member when the recess is positioned in overlying relationship with the respective openings. Rotation or translation of the tubular outer member relative to the inner body member shifts the recess out of registration with the respective peripheral openings, to thereby prevent flow of material through the valve. Shifting of the outer member is accomplished by means of a pneumatic cylinder that is carried by the inner body member to shift the tubular outer member relative to the cylindrical body member.

25 Claims, 4 Drawing Sheets

NOZZLE SHUT-OFF VALVE FOR AN INJECTION MOLDING MACHINE

BACKGROUND OF THE INVENTION

1. Field of the Invention

The present invention relates to a nozzle shut-off valve adapted for use on the injection system of an injection molding machine. More particularly, the present invention relates to a positive action shut-off valve that includes a cylindrical body portion and a sleeve that is slidably carried by the body portion to provide selective communication between a valve inlet and a valve outlet.

2. Description of the Related Art

Nozzle shut-off valves are provided in the forward or discharge end of the plastication barrel of an injection molding machine to control the flow of plasticated material from the barrel. The valves operate to prevent flow of plasticated material from the plastication barrel until a predetermined quantity of plasticated material has been accumulated ahead of the plastication screw to fill a mold cavity. At that point the shut-off valve is opened and the plastication screw or ram is moved axially within the barrel in the direction toward the shut-off valve to inject the plasticated material through the valve and into a mold cavity defined by a mold that is positioned adjacent an outlet nozzle at the discharge end of the plastication barrel.

Various types of shut-off valve structures have been used in the past. For example, U.S. Pat. No. 3,500,501, which issued Mar. 17, 1970, to O. R. Johansson, discloses a pneumatically operated shut-off valve in the form of a spool that is transversely movable relative to a flow passageway, the spool having a transverse throughbore that is selectively alignable with the flow passageway to permit or to prevent flow through the flow passageway, depending upon the position of the throughbore relative to the flow passageway.

In U.S. Pat. No. 3,431,600, which issued Mar. 11, 1969, to C. P. Bullard et al., there is disclosed a nozzle shut-off valve that provides a rotatable ball element having a diametral through passageway, the through passageway being selectively alignable and non-alignable relative to a flow passageway, and an actuating cylinder for rotating the ball member about a horizontal axis to cause the ball passageway to come into and out of alignment with the flow passageway.

U.S. Pat. No. 3,809,519, which issued May 7, 1974, to Paul J. Garner, discloses a nozzle shut-off valve wherein a pair of inlets are selectively connectible with a single outlet. A cylindrical body includes a pair of transversely extending throughbores that are inclined relative to each other, the respective throughbores being alignable with one or the other of the inlets to provide communication between that inlet and the valve outlet.

Although the prior art nozzle shut-off valves have generally functioned in a satisfactory manner, oftentimes they do not serve to provide a positive shut-off of the flow from the plastication barrel. It is therefore an object of the present invention to provide an improved nozzle shut-off valve that provides positive shut-off of flow of plasticated material. It is a further object of the present invention to provide a nozzle shut-off valve that is of simple construction, that has few moving parts, and that is easily controllable.

SUMMARY OF THE INVENTION

Briefly stated, in accordance with one aspect of the present invention, a nozzle shut-off valve is provided for the injection system of an injection molding machine. The valve includes an inner body member having an outer surface and a longitudinal axis. The inner body member includes a pair of ends that are spaced from each other along the longitudinal axis, one end including an inlet opening and the other end including an outlet opening. A pair of passageways extend inwardly into the body member from each end at the inlet and outlet openings, each passageway terminating at a point between the ends of the inner body member at respective openings on the outer surface of the body member. The openings are spaced from each other so that there is not a continuous flow path through the inner body member from the inlet opening to the outlet opening.

An outer member is provided to surround the inner body member, the outer member having an inner surface that is adapted to be slidably positioned on the outer surface of the inner body member to permit relative sliding movement between the inner body member and the outer member. The outer member includes at least one communication pathway sufficient to permit communication between a pair of spaced openings on the outer surface of the inner body member.

An actuation arrangement is carried by one of the body member and the outer member for selectively imparting relative motion between the inner body member and the outer member from a first position, wherein the communication pathway in the outer member is positioned to permit communication between a pair of openings in the outer surface of the inner body member to thereby permit flow of fluid between the inlet and outlet of the body member, to a second position wherein the communication pathway in the outer member is positioned to prevent communication between a pair of the openings in the outer surface of the inner body and thereby prevent flow of fluid between the inlet and the outlet of the body member.

DESCRIPTION OF THE PREFERRED EMBODIMENTS

Figure 1:
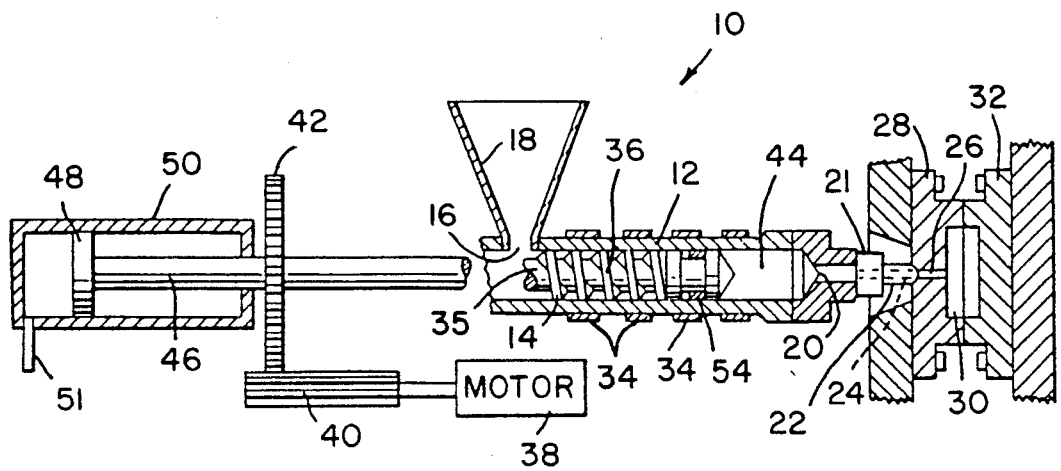
FIG. 1 is a fragmentary cross-sectional side view of a portion of the injection system of an injection molding machine along with an article-defining mold into which plasticated material is injected after passage of the material through a shut-off valve in accordance with the present invention.

Referring now to the drawings, and particularly to FIG. 1 thereof, there is shown a portion of the plastication and injection section of a reciprocating screw injection molding machine 10. That machine includes a tubular barrel 12 within which a plasticating screw 14 is rotatably and axially slidably received. Barrel 12 includes a material inlet 16, and an upwardly extending cone-shaped hopper 18 for receiving particles of polymeric material to be plasticated. Barrel 12 also includes an outlet 20, a shutoff valve 21, and an outlet nozzle 22, the nozzle having a passageway 24 that is in communication with a sprue 26 provided in one half 28 of a mold defined by a pair of cooperating mold halves 28 and 32. The mold halves together define a mold cavity 30, which communicates with sprue 26.

A plurality of axially spaced, circumferentially positioned band heaters 34 are provided on barrel 12 to heat the barrel in order to assist the mechanical action of the screw to soften the polymeric material and to cause it to become molten for injection into mold cavity 30. Although an external source of heat in the form of resistance band heaters is shown, it will be apparent to those skilled in the art that other forms of external heat sources can also be employed, if desired.

Plasticating screw 14 includes a generally cylindrical or conical body 35, around the outer periphery of which one or more helical screw flights 36 are provided. When rotated, screw 14 carries the particles of polymeric material from the barrel inlet 16 toward barrel outlet 20. During transit between those points within the barrel, the particles are softened, both by the heat generated as a result of the mechanical working action of plasticating screw 14 on the particles, as well as by the external heat supplied by band heaters 34.

Screw 14 is rotated by a suitable motor 38 through a gear train 40, 42, or the like, and as the plasticated material is conveyed to the forward portion of the screw, toward barrel outlet 20, the softened material accumulates in collection volume 44 at the forward end of barrel 12 because shut-off valve 21 is closed, and as the volume of accumulating material increases, screw 14 is gradually pushed toward the left, as viewed in FIG. 1, away from nozzle 22. The rearmost end 46 of screw 14 includes a piston 48 that is slidably received within a cylinder 50. Hydraulic pressure is maintained on the rear face of piston 48, through conduit 51, to maintain a back pressure on the material being accumulated.

The softened plasticated material passes from the screw flights through an anti-backflow valve 54 positioned at the forward end of the screw, and to collection volume 44 at the forward end of barrel 12. When the desired quantity of plasticated material has been accumulated ahead of the screw, a quantity normally designated as a "shot," the rotation of the screw is stopped. High pressure hydraulic fluid is then introduced through conduit 51 into cylinder 50 against the rear face of piston 48. Nozzle shut-off valve 21 is then opened, to enable screw 14 to move to the right, as viewed in FIG. 1, to cause the shot of plasticated material to flow through barrel outlet 20, shut-off valve 21, nozzle 22, sprue 26, and into mold cavity 30. Pressure is maintained on the plasticated material in the mold until the material has cooled sufficiently so that the molded article is in a solidified condition. Thereupon, nozzle shut-off valve 21 is closed and the screw is again rotated to accumulate another shot. The cycle is successively repeated to provide successive molded parts.

Referring now to FIGS. 2 through 6, there are shown various views of an improved nozzle shut-off valve 21 in accordance with the present invention. Valve 21 includes an inner cylindrical body 52 having an inlet opening 54 at an inlet end 56 and an outlet opening 58 at the opposite, outlet end 60. Between ends 56 and 60 is a substantially cylindrical central body 62 that includes four inclined circular passageways 64, 66, 68, and 70 that extend from the central axis of inner cylindrical body 52 and terminate in respective elliptical openings 72, 74, 76, and 78 at spaced points on the outer periphery of central body 62. One pair 64, 66 of inclined passageways intersect and terminate interiorly of inner cylindrical body 52 at substantially its longitudinal axis, and communicate through inlet passageway 80 with the valve inlet opening 54. Similarly, the other pair 68, 70 of inclined passageways also intersect and terminate on the axis of inner cylindrical body 54 and communicate through outlet passageway 82 with valve outlet opening 58. Consequently, both inlet opening 54 and outlet opening 58 of inner cylindrical body 52 are not in direct communication, because there is not a continuous flow path through inner cylindrical body 52 between inlet opening 54 and outlet opening 58 of valve 21.

Surrounding inner cylindrical body 52 is a tubular outer sleeve 84 that is slidably carried on the periphery of central body portion 62. Outer sleeve 84 includes a pair of diametrically opposed communication pathways in the form of recesses 86, 88, or depressions, that extend radially outwardly from inner surface 90 of outer sleeve 84. Recesses 86, 88 are of elongated configuration and extend in a generally axial direction relative to the axis of outer sleeve 84. The axial length of recesses 86, 88 is such as to permit communication between two adjacent ones of spaced openings 72, 78 and 74, 76 on the periphery of central body portion 62 when the respective recess is positioned so that it overlies and communicates with a pair of spaced openings, and thereby with the respective inclined passageways that terminate in the respective openings. Likewise, when a recess is shifted circumferentially relative to central body portion 62, such as by rotation of outer sleeve 84 relative to inner cylindrical body 52, the respective openings in the periphery of central body portion 62 are no longer in direct communication, thereby shutting off the flow of fluid therebetween and through valve 21.

Figure 2:
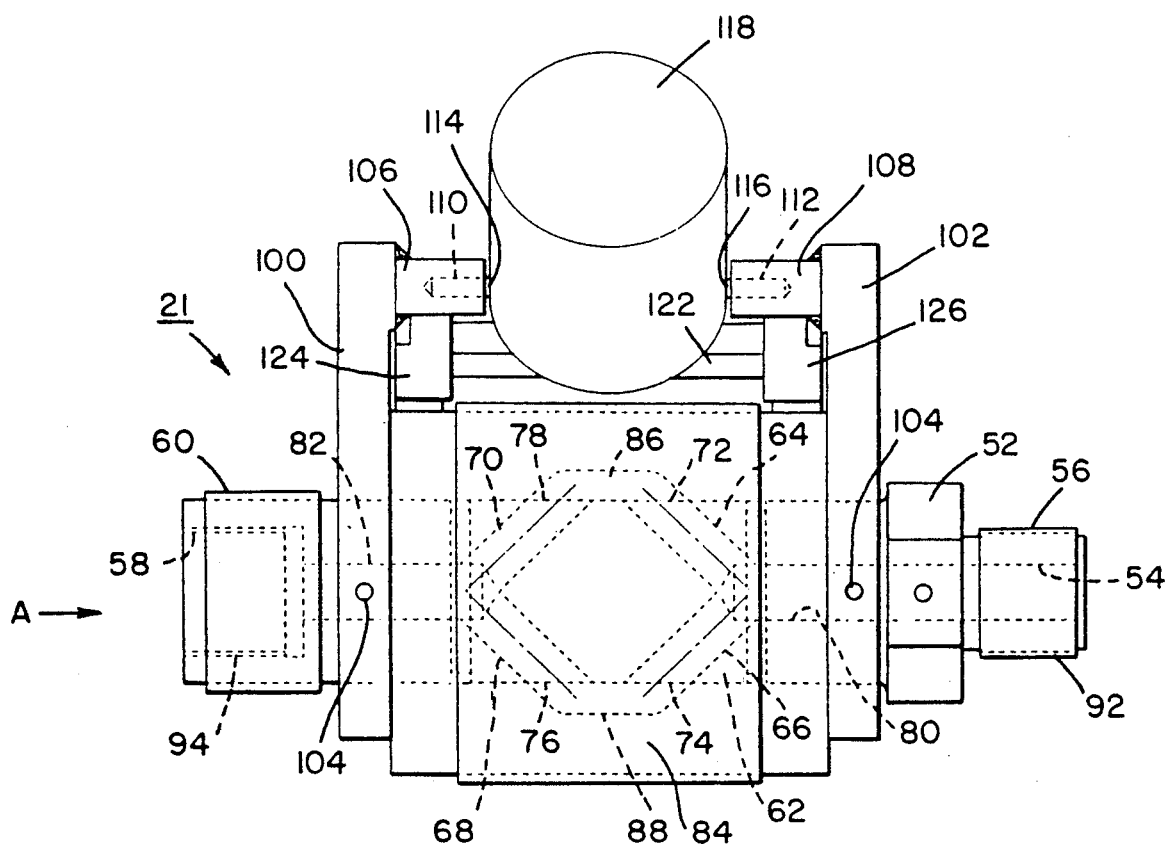
FIG. 2 is a side view of a nozzle shut-off valve in accordance with the present invention.
Figure 3:
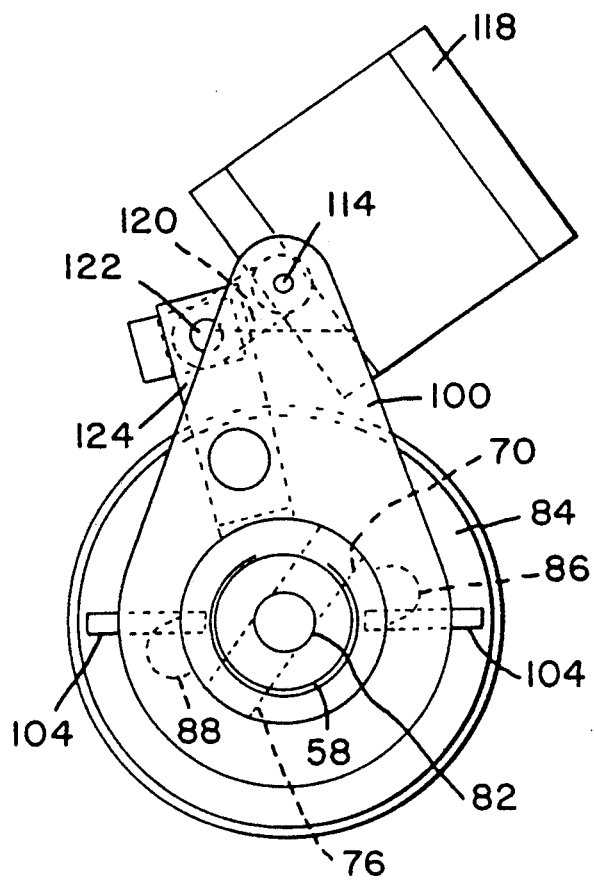
FIG. 3 is an end view of the nozzle shut-off valve shown in FIG. 2, and viewed in the direction of arrow A thereof.

As best seen in FIGS. 2 and 3, inlet end 56 of inner cylindrical body 52 includes an external thread 92, the thread being adapted to be engagable with a corresponding internal thread (not shown) on the interior surface at the outlet of the plastication barrel 12 to secure valve 21 to barrel 12. Similarly, outlet end 60 of valve 21 includes an internal thread 94 that engages with corresponding external thread (not shown) carried by nozzle tip 22, as is illustrated generally in FIG. 1. Outer sleeve 84 is carried by inner cylindrical body 52 and has an axial length that is greater than the axial length of central body portion 62, so that outer sleeve 84 extends axially beyond each of a pair of axially spaced sealing ring grooves 96, 98 provided in inner cylindrical body 52 for receiving a suitable sealing ring (not shown), such as, for example, an O-ring. Positioned axially outwardly from each end of outer sleeve 84 is a respective cylinder mounting bracket 100, 102 that is carried on the outer surface of inner cylindrical body 52, each of which brackets is pinned to inner cylindrical body 52 by means of roll pin 104. Thus, cylinder mounting brackets 100, 102 are each non-rotatably carried on inner cylindrical body 52.

Each of cylinder mounting brackets 100, 102 includes a boss 106, 108, respectively, that is positioned radially outwardly from the longitudinal axis of valve 21, and each boss includes a blind bore 110, 112, respectively. Blind bores 110 and 112 are in facing relationship to receive respective coaxially disposed pivot pins 114, 116 carried by pneumatic cylinder 118 to pivotally support the pneumatic cylinder between mounting brackets 100 and 102. Cylinder 118 includes a rod member 120 that extends outwardly therefrom and is connected to an axially extending pin 122, to the ends of which are secured sleeve arms 124, 126 that extend in a substantially radial direction relative to valve 21 and that are connected with outer sleeve 84 by means of cap screws that are threadedly received in respective axially extending bores 128, 130 that are each adjacent a respective radial slot 132, 134 provided at the ends of outer sleeve 84.

Figure 4:
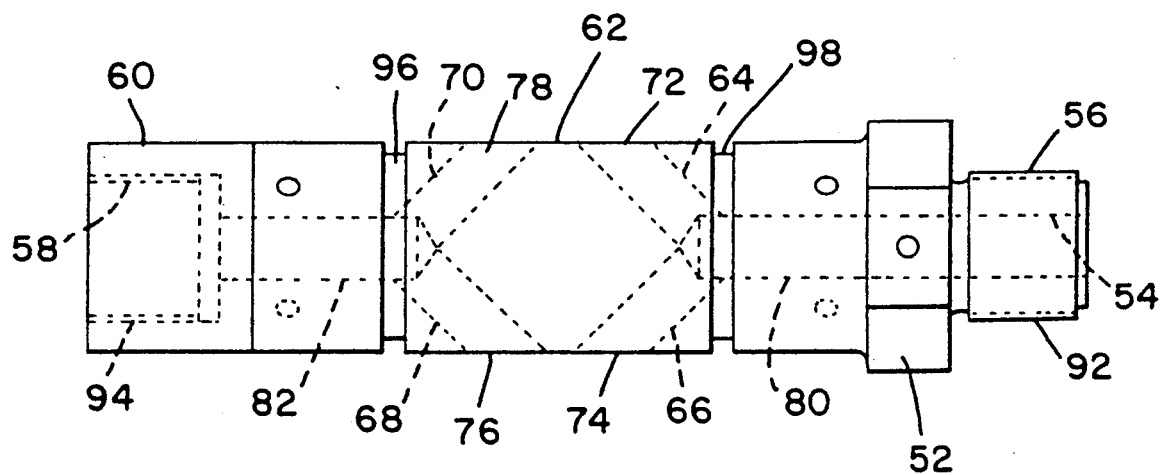
FIG. 4 is a side view of an inner body that forms a part of the nozzle shut-off valve in accordance with the present invention.
Figure 5:
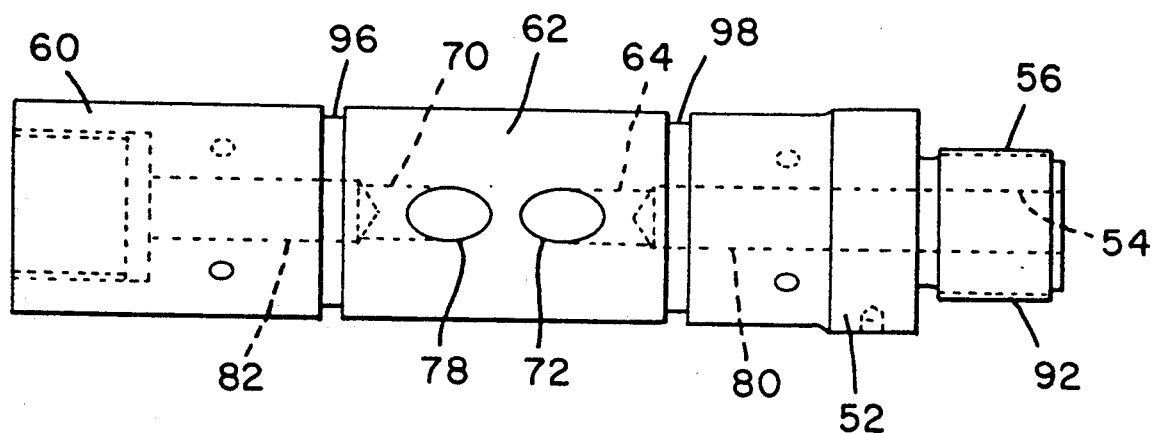
FIG. 5 is a top view of the inner body member illustrated in FIG. 4.
Figure 7:
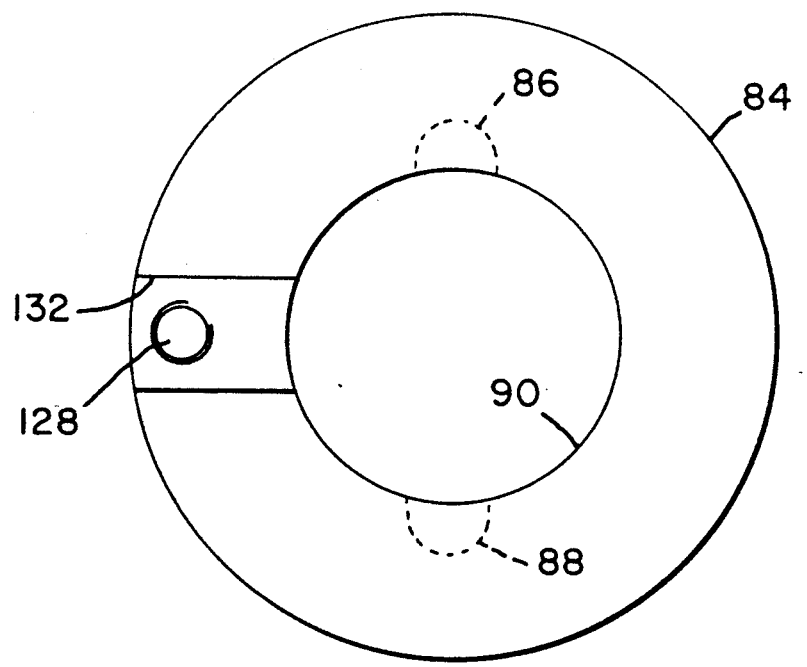
FIG. 7 is an end view of the outer sleeve member illustrated in FIG. 6.
Figure 6:
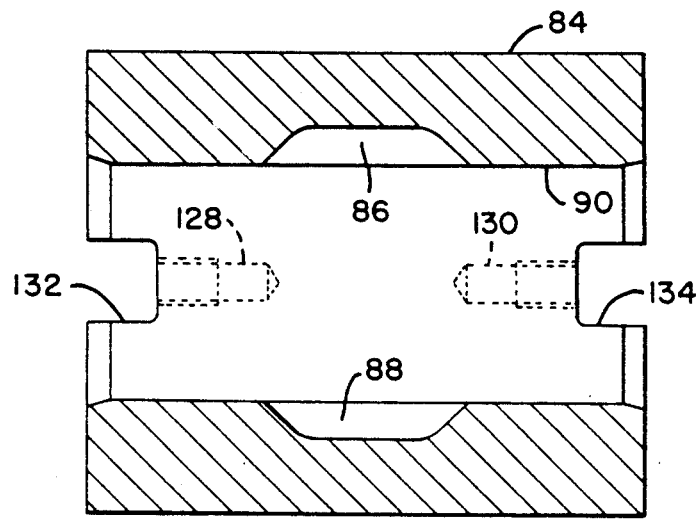
FIG. 6 is a longitudinal, cross-sectional view of an outer sleeve member forming part of a nozzle shut-off valve in accordance with the present invention.

The structure of inner cylindrical body 52 is illustrated in FIGS. 4 and 5, and that of outer sleeve member 84 is illustrated in FIGS. 6 and 7. Referring now to the latter two drawing figures, the axially extending recesses 86, 88 on the interior surface 90 of outer sleeve member 84 are shown as positioned in diametrically opposed relationship. Further, each recess has a generally U-shaped cross section, and inwardly sloping end walls that terminate at interior surface 90 to provide a smooth transition for flow of plasticated material between the adjacent spaced openings in the outer periphery of central body portion 62. The orientation of recesses 86, 88 relative to the respective peripheral openings is best seen in FIG. 2, which shows the recesses positioned to provide communication between the respective peripheral openings, and thereby provide a direct flow path through the valve.

In operation, when plastic material is undergoing plastication and is being accumulated at the forward end of plastication barrel 12, valve 21 is closed to permit the accumulation ahead of screw 14 of a sufficient quantity of plasticated material to substantially fill mold cavity 30 to provide the desired molded article. Once the necessary quantity of material has been accumulated, rotation of plastication screw 14 is stopped, and pressurized hydraulic fluid is introduced at the head end of piston 48 through conduit 52 to cause screw 14 to move toward nozzle tip 22 and force plasticated material to flow into mold cavity 30. At substantially the same time, valve 21 is opened by introducing pressurized air into the head end of pneumatic cylinder 118 to cause piston rod 120 to move outwardly from cylinder 118, to thereby carry pin 122 and sleeve arms 124, 126 in a counter-clockwise direction, as viewed in FIG. 3, a sufficient distance to permit the recesses in outer sleeve 84 to come into alignment with the respective inclined passageways 72, 78 and 74, 76 in inner body member 52, and thus provide communication between the respective spaced openings and permit the accumulated plastic material to pass through shut-off valve 21, through nozzle tip 22, and into mold cavity 30. When the injection of the plasticated material has been completed, pressurized air is introduced into the rod end of pneumatic cylinder 118 to cause piston rod 120 to retract into cylinder 118, thereby moving pin 122, sleeve arms 124, 126, and outer sleeve 84 in a clockwise direction, as viewed in FIG. 3, to substantially the position illustrated in that figure, at which position the respective recesses in outer sleeve 84 are shifted out of registry with the peripheral openings in inner cylindrical body 52, thereby preventing any flow from taking place through valve 21. Thereupon, plastication is reinitiated, and additional plastic material is accumulated ahead of screw 14 to provide sufficient material for a second injection operation that is initiated after the par resulting from the first injection operation has been removed from the mold.

Figure 8:
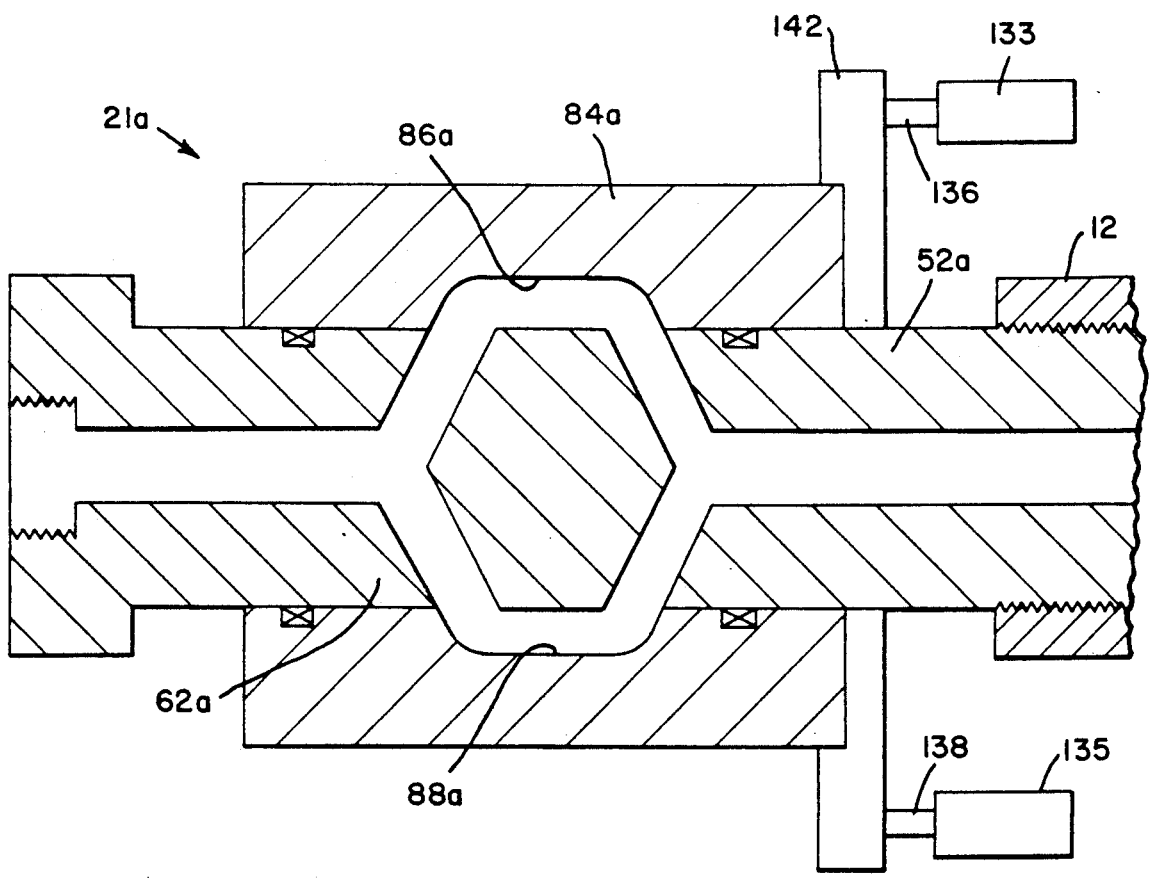
FIG. 8 is a diagrammatic side cross-sectional view of another embodiment of a nozzle shut-off valve in accordance with the present invention.

In addition to rotating outer sleeve 84 relative to inner cylindrical body 52 in order to selectively bring the inclined passageways into and out of communication with each other, the outer sleeve can also be shifted relative to the inner cylindrical body by moving the sleeve in an axial direction. The physical arrangement for that embodiment of the present invention is illustrated in FIG. 8, in which the valve inner body 52a and outer sleeve member 84a are of substantially the same structure as in the embodiment illustrated in FIGS. 2 and 3. However, instead of a radially acting pneumatic cylinder as shown in FIGS. 2 and 3, the embodiment involving linear motion of sleeve 84a is operated by a pair of substantially longitudinally arranged cylinders 133, 135 that are positioned diametrically opposite from each other relative to the axis of valve 21a. Each cylinder 133, 135 includes a piston rod 136, 138, respectively, that is connected with a pusher plate 142 that is secured to one end of outer sleeve 84a. Sufficient axial spacing is provided between the ends of outer sleeve 84a and the respective inlet and outlet ends of valve 21a to permit linear sliding movement of outer sleeve 84a relative to inner cylindrical body 52a. Thus, in the position illustrated in FIG. 8, recesses 86a, 88a in outer sleeve 84a are shown as positioned relative to the peripheral openings in central body portion 62a to permit direct communication between the spaced openings. Lateral shifting of outer sleeve 84a, either toward the right or toward the left, as viewed in FIG. 8, for a sufficient distance will shift the recesses axially so that communication with only one of the inclined passageways is provided, as a result of which flow through valve 21a is stopped. Resumption of flow can be effected by returning sleeve 84a to the position illustrated in FIG. 8.

It can thus be seen that the present invention provides an improved nozzle shut-off valve structure that is of simple construction, is capable of quick operation, and provides positive flow and shut-off characteristics.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. An injection molding machine comprising a nozzle shut-off valve for selectively opening and closing an injection outlet of a plastication barrel of the injection molding machine, said valve comprising:
   an inner body member having a longitudinal axis and first and second ends spaced from each other along the longitudinal axis, the first end having an inlet opening and the second end having an outlet opening, and the inner body member further having an outer surface with a first opening in fluid communication with the inlet opening and a second opening in fluid communication with the outlet opening;

an outer member surrounding the inner body member, the outer member having an inner surface adapted to be slidably positioned on the outer surface of the inner body member to permit relative sliding movement between the inner body member and the outer member, the outer member further having communication means for providing fluid communication between the first and second openings of the inner body member in response to the outer member being in a predetermined position relative to the inner body member; and actuation means having a first part fixed in position relative to the inner body member and a second part movable relative to the first part and operatively connected with the outer member for shifting the outer member between a first position wherein thee is communication between the inlet opening and the outlet opening of the inner body member, and a second position wherein communication between the inlet opening and the outlet opening is precluded.

2. The injection molding machine in accordance with claim 1, wherein the outer surface of the inner body member and the inner surface of the outer member are each cylindrical and the outer member is slidably received on the inner member with their respective cylindrical surfaces in contacting relationship.

3. The injection molding machine in accordance with claim 1, wherein the outer member is rotatable relative to the inner body member about the inner body member longitudinal axis.

4. The injection molding machine in accordance with claim 1, wherein the outer member is linearly slidable axially relative to the inner body member in a direction parallel with the inner body longitudinal axis.

5. The injection molding machine in accordance with claim 1, wherein the inner body member includes a cylindrical outer surface and the outer member includes a cylindrical inner surface the inner and outer surfaces being in surface to surface contact to prevent passage of plasticated material therebetween.

6. The injection molding machine in accordance with claim 5, including sealing means positioned between the inner body member and the outer body member axially outwardly of the first and second openings to prevent leakage between the inner body member and the outer member.

7. The injection molding machine in accordance with claim 6, wherein the first part of the actuation means is carried by the inner body member.

8. The injection molding machine in accordance with claim 7, wherein the first part of the actuation means is a pressurized-fluid-operated cylinder having a movable rod extending from the cylinder, said rod being connected with the outer member, the movable rod operable for selectively moving the outer member relative to the inner body member to selectively permit and prevent flow of a fluid medium through the valve.

9. The injection molding machine in accordance with claim 1, wherein the first and second openings in the inner body member outer surface are spaced from each other in an axial direction relative to the longitudinal axis of the inner body member.

10. The injection molding machine in accordance with claim 9, wherein the communication means in the outer member is elongated and has a longitudinal axis that is substantially parallel with the inner body member longitudinal axis.

11. The injection molding machine in accordance with claim 1, wherein the outer member is rotatable relative to the inner body member, and wherein the first part of the actuation means is carried by the inner body member.

12. The injection molding machine in accordance with claim 11, wherein the first part of the actuation means is a pneumatic cylinder.

13. The injection molding machine in accordance with claim 3, wherein the inner body member has a cylindrical outer surface and the outer member is of tubular configuration and includes a cylindrical inner surface that overlies the cylindrical outer surface to prevent passage of plasticated material therebetween.

14. The injection molding machine in accordance with claim 13, wherein the first and second openings in the inner body member outer surface are spaced from each other in an axial direction relative to the longitudinal axis of the inner body member.

15. The injection molding machine in accordance with claim 14, wherein the communication means in the outer member is elongated and has a longitudinal axis that is substantially parallel with the inner body member longitudinal axis.

16. The injection molding machine in accordance with claim 4, wherein the inner body member has a cylindrical outer surface, and the outer member has a cylindrical inner surface that overlies and contacts the inner body member cylindrical outer surface to prevent passage of plasticated material therebetween.

17. The injection molding machine in accordance with claim 16, wherein the first and second openings in the inner body member outer surface are spaced from each other in an axial direction relative to the longitudinal axis of the inner body member.

18. The injection molding machine in accordance with claim 17, wherein the communication means in the outer member is elongated and has a longitudinal axis that is substantially parallel with the inner body member longitudinal axis.

19. The injection molding machine in accordance with claim 18, including sealing means positioned between the inner body member and the outer body member axially outwardly of the first and second openings to prevent leakage between the inner body member and the outer member.

20. The injection molding machine in accordance with claim 19, wherein the first part of the actuation means is a pressurized-fluid-operated cylinder having a movable rod extending from the cylinder, said rod being connected with the outer member, the movable rod operable for selectively moving the outer member relative to the inner body member to selectively permit and prevent flow of a fluid medium through the valve.

21. The injection molding machine in accordance with claim 8, wherein the cylinder is pivotally supported by the inner body member for pivotal movement about an axis substantially parallel with the inner body member longitudinal axis.

22. The injection molding machine in accordance with claim 21, wherein the outer member includes at least one lever arm extending substantially radially outwardly relative to the inner member longitudinal axis, and the movable rod is connected with the lever arm for shifting the position of the outer member relative to the inner member.

23. The injection molding machine in accordance with claim 21, wherein the outer member includes two radially outwardly extending lever arms, lever arm connecting means extending between the two lever arms and spaced radially outwardly from the inner member longitudinal axis, and wherein the movable rod extends transversely relative to the lever arm connecting means and is pivotally connected with the lever arm connecting means for rotating the outer member relative to the inner member.

24. The injection molding machine in accordance with claim 8, wherein the outer member includes pusher plate means, and wherein the movable rod is oriented substantially parallel with the inner body longitudinal axis and is connected with the pusher plate means for shifting the outer member axially relative to the inner member.

25. The injection molding machine in accordance with claim 24, wherein the first part of the actuation means includes at least one additional pressurized-fluid-operated cylinder, each cylinder disposed substantially parallel with the inner member longitudinal axis for shifting the outer member relative to the inner member.

* * * * *